(12) United States Patent
Saboo et al.

(10) Patent No.: US 10,734,813 B2
(45) Date of Patent: Aug. 4, 2020

(54) TRIPLE INPUT SMART POWER SUPPLY (TRISP) FOR DESKTOP PC AND OTHER SYSTEMS USING DC AS FINAL POWER SOURCE

(71) Applicant: INDIAN SPACE RESEARCH ORGANISATION, Bangalore (IN)

(72) Inventors: Thankappan Saboo, Kerala (IN); Varapparampil Shanmughan Prathap, Kerala (IN); Maniyanplackal Sreedharan Sibu, Kerala (IN)

(73) Assignee: INDIAN SPACE RESEARCH ORGANISATION, Bangalore (IN)

(*) Notice: Subject to any disclaimer, the term of this patent is extended or adjusted under 35 U.S.C. 154(b) by 109 days.

(21) Appl. No.: 16/071,909

(22) PCT Filed: Feb. 10, 2017

(86) PCT No.: PCT/IB2017/050729
§ 371 (c)(1),
(2) Date: Jul. 23, 2018

(87) PCT Pub. No.: WO2017/137932
PCT Pub. Date: Aug. 17, 2017

(65) Prior Publication Data
US 2019/0157873 A1 May 23, 2019

(30) Foreign Application Priority Data

Feb. 12, 2016 (IN) .............................. 201641004989

(51) Int. Cl.
*G06F 1/26* (2006.01)
*H02J 3/38* (2006.01)
(Continued)

(52) U.S. Cl.
CPC .............. *H02J 3/383* (2013.01); *G06F 1/189* (2013.01); *G06F 1/263* (2013.01); *G06F 1/30* (2013.01);
(Continued)

(58) Field of Classification Search
CPC ...... H02J 3/383; H02J 1/12; H02J 7/35; H02J 9/06; H02S 40/30; G06F 1/189;
(Continued)

(56) References Cited

U.S. PATENT DOCUMENTS 7,564,149 B2  7/2009  Siri et al.
7,777,462 B2  8/2010  Kudo et al.
(Continued)

FOREIGN PATENT DOCUMENTS

CN  203691035  *  7/2014
EP  2889985     7/2015
(Continued)

OTHER PUBLICATIONS

Cun et al., "The experience of a UPS company in advanced battery monitoring", Proceedings of Intelec'96—International Telecommunications Energy Conference, Oct. 6, 1996, 646-653.

*Primary Examiner* — Volvick Derose
(74) *Attorney, Agent, or Firm* — Mark M. Friedman

(57) ABSTRACT

The present invention discloses a triple input smart power supply module capable to work with solar power, utility power or battery to empower the desktop PC and any other gadgets where final power source is DC, to stand brown outs and black outs reliably and saving 58 to 65% of power and much more when connected with solar panel. For PC application it comprises of 10-16V DC-DC ATX PC power supplies, 15V DC power supply from 230V AC using PFC techniques, switching rectifier circuits, a solar panel within the range 50-80 Wp, 12V SMF battery, a current limited
(Continued)

charger circuit and a monitor working on 12V DC. The invention will be a revolutionary and path breaking venture in the production and use of "Green PCs". Scope of TRISP is not limited to PCs and it can be extended to any gadget requiring steady and clean input power with a backup facility, where final input power source is DC.

16 Claims, 3 Drawing Sheets

(51) Int. Cl.
| | |
|---|---|
| *H02J 7/35* | (2006.01) |
| *H02J 9/06* | (2006.01) |
| *H02J 1/12* | (2006.01) |
| *H02S 40/30* | (2014.01) |
| *G06F 1/18* | (2006.01) |
| *G06F 1/30* | (2006.01) |
| *H02M 1/42* | (2007.01) |
| *G06F 1/3203* | (2019.01) |

(52) U.S. Cl.
CPC .................. *H02J 1/12* (2013.01); *H02J 7/35* (2013.01); *H02J 9/06* (2013.01); *H02M 1/4208* (2013.01); *H02S 40/30* (2014.12); *G06F 1/3203* (2013.01); *Y02B 10/72* (2013.01); *Y02E 10/566* (2013.01)

(58) Field of Classification Search
CPC ........ G06F 1/263; G06F 1/30; H02M 1/4208; Y02B 10/72; Y02E 10/566
USPC .......................................................... 713/300
See application file for complete search history.

(56) References Cited

U.S. PATENT DOCUMENTS

| | | | |
|---|---|---|---|
| 2013/0002031 A1* | 1/2013 | Mulkey ................... | H02J 3/385 307/82 |
| 2013/0207473 A1* | 8/2013 | Jain .......................... | H02J 7/35 307/65 |
| 2014/0060100 A1* | 3/2014 | Bryson ................... | H02J 3/385 62/235.1 |
| 2015/0180230 A1 | 6/2015 | Xu et al. | |
| 2015/0349629 A1* | 12/2015 | Wu .......................... | H02M 1/00 323/205 |

FOREIGN PATENT DOCUMENTS

| | | |
|---|---|---|
| JP | 2001504680 | 4/2001 |
| JP | 2008-029087 | 2/2008 |
| JP | 2014-036550 | 2/2014 |
| JP | 2015-023766 | 2/2015 |
| WO | 1998/41793 | 9/1998 |

* cited by examiner

TRIPLE INPUT SMART POWER SUPPLY (TRISP) FOR DESKTOP PC AND OTHER SYSTEMS USING DC AS FINAL POWER SOURCE

FIELD OF THE INVENTION

The invention is in the field of power sources integrated with simple backing up facility, and relates to a power saving device, with greater reliability and lesser power line polluting characteristics. This invention is capable to work with solar power, utility power or rechargeable battery to power a desktop PC or any other system using DC as its final input power source, reliably standing black outs and brown outs. The invention is very much useful in effecting a power saving of 58 to 65% when used with PCs for domestic or industrial applications, and the power saving is much more when connected with solar panel. This will be a revolutionary and path breaking venture in the production and effective use of "Green Power" devices. TRISP is designed to power desktop PCs and any other gadget requiring steady and clean input power with a backup facility.

BACKGROUND OF THE INVENTION

Black outs, frequent brown outs, wastage of power and deterioration in power line quality are major problems in the electrical power distribution system of developing countries. Usage of PCs is increasing in the urban and suburban region exponentially in domestic, commercial and industrial sectors which calls for a proportional increase in the use of UPS systems to take care of the unreliable utility power conditions. A significant amount of money is to be spent for the procurement and maintenance of the UPS systems. Uncontrolled increase of online UPS systems results in high level of harmonics induction in to power lines. Power consumed by UPS depends on the quality of design and components used which will directly add to the wasted power. Many of the products popular in the market including branded ones produce current and voltage surges, distorted wave forms and other deteriorations in the power line quality. Wastage of costly floor space for placing UPS and battery is another important concern. Chances of fire hazards due to capacitor banks, high power switching inside UPS and discharges from batteries are other difficulties faced. Low overall efficiency, poor power factor and comparatively lower reliability are other limitations. Another concern is about the efficiency of the conventional SMPS used internally to power PCs and other equipments. The popular brands commercially available in desktop PCs in the market were tested for its overall efficiency and the result was as low as 35% when used along with online UPS systems.

Generally UPSs are classified as on line and off line categories. Off line category has very low KVA rating. Online UPS is expensive and requires frequent maintenance. It also generates more harmonics and cause related grounding issues. In addition to online and offline, line interactive (Mains and inverter power synchronized) models are also available which are not generally recommended for PC applications. Mains supply is converted in to DC and then to AC inside UPS. This AC from UPS is again converted to required DC voltages in the PC. This multistage AC/DC and DC/AC conversions in UPS and SMPS make system low efficient and increases the chances of breakdown. Due to low overall efficiency of PC SMPS with UPS combination, backup time is very low considering the actual mother board power requirement.

An extensive prior art search has been conducted which revealed the existence of following devices which are currently in use for the above mentioned applications.

Three major brands of UPS for PC application were compared for their performance through power in watts (W), volt ampere (VA), reactive power (VAR), power factor (PF) and input current (I).

| UPS MODEL | NO LOAD | ONE PC | TWO PC | THREE PC |
|---|---|---|---|---|
| DELTA<br>MODEL 1 KVA<br>GES102N212035<br>S NO 82L10600451WK | W = 49<br>VA = 100<br>VAR = −85<br>V = 229<br>I = 0.43<br>PF = 0.45lead | W = 106<br>VA = 133<br>VAR = −75<br>V = 229<br>I = 0.52<br>PF = 0.8lead | W = 165<br>VA = 185<br>VAR = −85<br>V = 229<br>I = 0.8<br>PF = 0.88lead | W = 223<br>VA = 240<br>VAR = −100<br>V = 229<br>1 = 1.05<br>PF = 0.94lead |
| EATON E SERIES DX<br>MODEL 1 KVA/0.8 KW<br>S NO 130109-25100179 | W = 56<br>VA = 93<br>VAR = −69<br>V = 229<br>I = 0.40<br>PF = 0.62lead | W = 118<br>VA = 134<br>VAR = −70<br>V = 229<br>I = 0.59<br>PF = 0.85lead | W = 170<br>VA = 190<br>VAR = −71<br>V = 229<br>I = 0.83<br>PF = 0.936lead | W = 234<br>VA = 248<br>VAR = −68<br>V = 229<br>I = 1.07<br>PF = 0.96lead |
| EATON E SERIES DX<br>MODEL 1 KVA/0.8 KW<br>S NO 130109-25100179<br>(CPU LOADED) | W-56<br>VA = 93<br>VAR = −69<br>V = 229<br>I = 0.4<br>PF = 0.62lead | W = 145<br>VA = 163<br>VAR = −68<br>V = 229<br>I = 0.71<br>PF = 0.90lead | W = 216<br>VA = 223<br>VAR = −65<br>V = 229<br>I = 0.98<br>PF = 0.96lead | W = 228<br>VA = 292<br>VAR = −63<br>V = 229<br>I = 1.3<br>PF = 0.98lead |
| APC 550 VA<br>MODEL RS 550<br>S NO BB0947021887 | W = 9<br>VA = 27<br>VAR = −26<br>V = 229<br>I = 0.11<br>PF = 0.32lead | W = 72<br>VA = 145<br>VAR = −125<br>V = 229<br>I = 0.6<br>PF = 0.49lead | W = 127<br>VA = 249<br>VAR = −211<br>V = 229<br>I = 1.08<br>PF = 0.522lead | W = 190<br>VA = 312<br>VAR = −244<br>V = 229<br>I = 1.32<br>PF = 0.58lead |

The conventional SMPS used as power supply in PC has no power backup capability, it cannot accept solar panel output directly and causes more power loss resulting in poorer efficiency.

To sum up, the existing devices are providing only lower efficiency, economy and reliability. The above drawbacks of the prior art evolved a need for development of a new device which supports any gadget requiring steady and clean input DC power with an extended back up facility.

OBJECTS OF THE INVENTION

In order to address the drawbacks of prior art, present invention discloses an advanced power supply called TRISP to use on any systems which uses DC as its final input power source like desktop PCs. For a Desktop PC, TRISP is functional from 10.0V to 16 V DC input with solar photo voltaic (SPV) power readiness and automatic logic to prioritize solar, utility, and battery in the preferred order. This invention can be used for any application where load is finally powered by DC, or any application similar to the power supply of PCs.

Even though the invention is applicable to any system which uses DC as its final input power source, for demonstration purpose, Desktop PCs are taken. This is because huge numbers of PCs are in use globally and the count is increasing day by day.

The primary object of the invention is to save 58 to 65% of power and much more when connected with solar panel.

Another objective of the invention is to eliminate UPS and extend backup time to multi-fold (4-5 times in the case of desktop PCs).

Yet another objective of the invention is to enable the use of solar power for desktop PCs and any other system which uses DC as its final input power source, with additional cost of solar panel alone.

Still another objective of the invention is to provide backup facility, with improved reliability requiring minimum maintenance.

TRISP based power source require less number of battery with lesser AH rating thus reducing the Lead used in these systems making it more environmental friendly.

Further objective of the invention is to significantly reduce the harmonics injected to power line from UPS.

Still further object of the invention is to provide improved power factor.

SUMMARY OF THE INVENTION

Disclosed herein is a TRISP for desktop PC and other systems using DC as final power source, functional from 10V to 16 V DC input with SPV power readiness. The invention is of generic nature and finds use with desktop PCs and other systems which finally work on DC power with a requirement of power backup.

The TRISP design can be applied and adapted to any application wherein the system is finally operated on DC. The demonstration device consists of 10 to 16V working ATX power supplies, 15V DC 5 A AC to DC power factor controlled power supply having efficiency greater than 90%, 12V SMF battery inside CPU cabinet for backup power, battery charger (Vmax 13.8 and current Imax 0.7 A) for charging battery, either from solar power or 15V DC power supply adapter and SPV panel (50 Wp-80 Wp). The TRISP also contains a power source, voltage and backup time indication which are displayed on the PC Monitor.

The invention has many distinctive features including the following:
1. The invention provides increased backup time in the range of 80 to 110 minutes for a standard desktop PC installed with TRISP using 12V 7 AH SMF battery.
2. The invention ensures the desktop PC to operate directly on solar power and keeping the battery charged when operated between 9 am and 4 pm, saving utility power during normal work hours, on reasonably sunny days. The time span of solar power usage is improved by appropriately selecting the power rating of Solar panel.
3. The intelligent switching mechanism enables TRISP to make use of even a small quantity of power developed in solar panel. In such case balance power requirement will be met from utility power source.
4. The invention can produce a power saving of 1747200 units and thereby a cost saving of Rs.14.2 Million for 10000 desktop PCs working for 8 hours per day for 312 days without using solar energy at current rates prevailing in the state of Kerala, India. If these systems are connected to solar panel, saving will be 24, 96,000 units of energy and 20.47 million of rupees.
5. The invention provides a TRISP with an efficiency of 90% whereas it is 35% for a normal SMPS when used along with online UPS.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and other advantages of the invention will be better understood and will become more apparent by referring to the exemplary embodiments of the invention, as illustrated in the accompanying drawings, wherein.

DETAILED DESCRIPTION OF THE INVENTION

Reference will now be made to the exemplary embodiments of the invention, as illustrated in the accompanying drawings. Where ever possible same numerals will be used to refer to the same or like parts.

The invention describes a Triple input smart power supply (TRISP) for desktop PC and other systems using DC as final power source. TRISP is a unique module capable of working with one of the three inputs such as solar power, utility power and battery power by intelligently prioritising the available favourable power source. The invention is of generic nature and finds use with desktop PCs and other systems which finally work on DC power with a requirement of power backup.

As stated before, the TRISP was implemented in a standard Desk top PC for demonstration. A Standard desktop PC actually consumes less than 40 watts DC power under normal operating conditions. DC/DC ATX PC power supply, powered from SPV panel is the most energy efficient and economic method to power up PCs. In addition to SPV panels, high efficiency AC/DC 15V power supply and SMF battery are used to run PC 24/7 hours by intelligently switching the favourable source seamlessly. SMF battery is charged from solar power as well as utility power. For battery charging and powering CPU and monitor SPV source is given the first priority. If solar power is not enough or absent, power is automatically drawn from utility supply. When utility power also fails power is drawn from battery. From the tests and trials conducted, a standard desktop PC can be backed up for 80 to 110 minutes from a fully charged 12V/7 AH battery. A 50 Wp solar panel can fully power the PC on all sunny days, from 10 am to 4 pm.

In the demonstration application, the conventional SMPS of desktop PC will be replaced with a DC-DC ATX, solar power friendly power supply backed by inbuilt SMF battery. This PC power supply will consume power from solar panels, utility power or battery in the respective order of priority, without any break in supply. It is proposed to use LCD/LED monitors operating on 12V DC. The existing 230V operated models which has 12V DC internal bus can be easily converted to operate on 12V DC voltage, tapped from TRISP.

Figure 1:
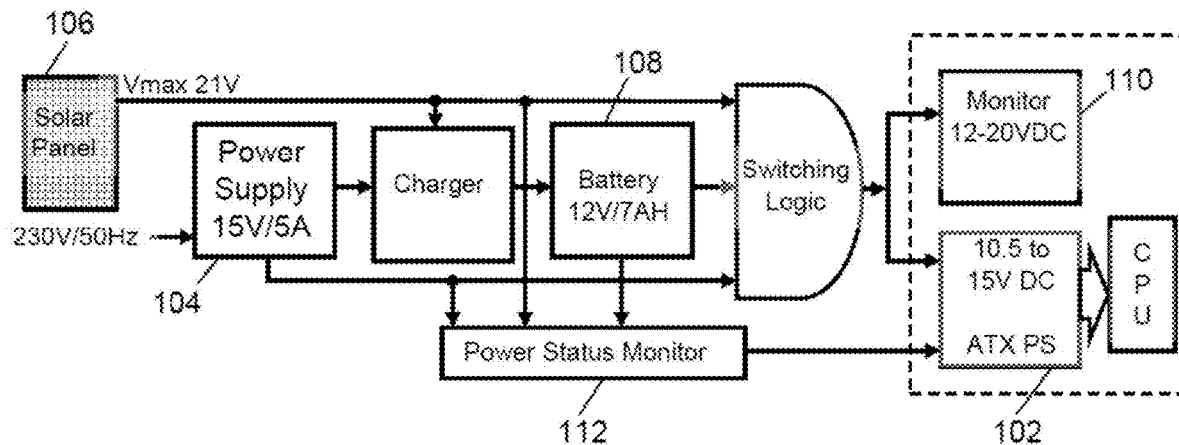
FIG. 1 shows the schematic representation of the TRISP system according to one embodiment of the present invention.
Figure 2:
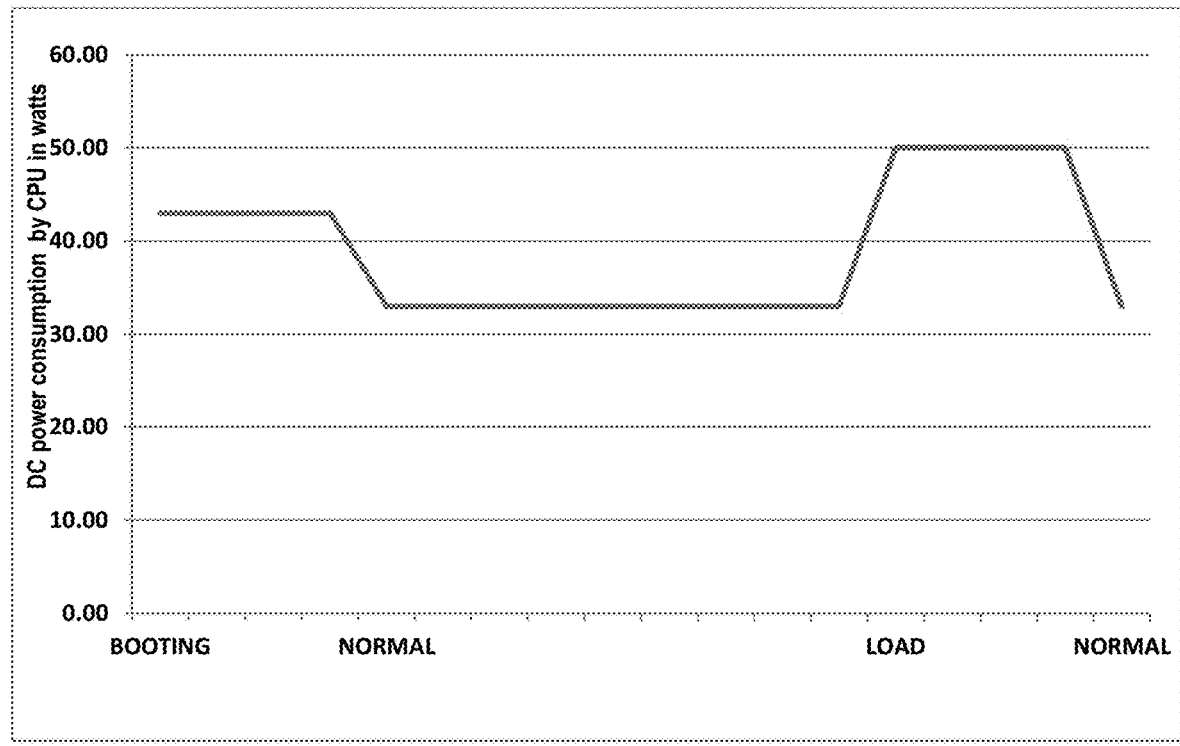
FIG. 2 shows the DC power consumption by CPU in watts at the time of booting, after booting and CPU loaded conditions.
Figure 3:
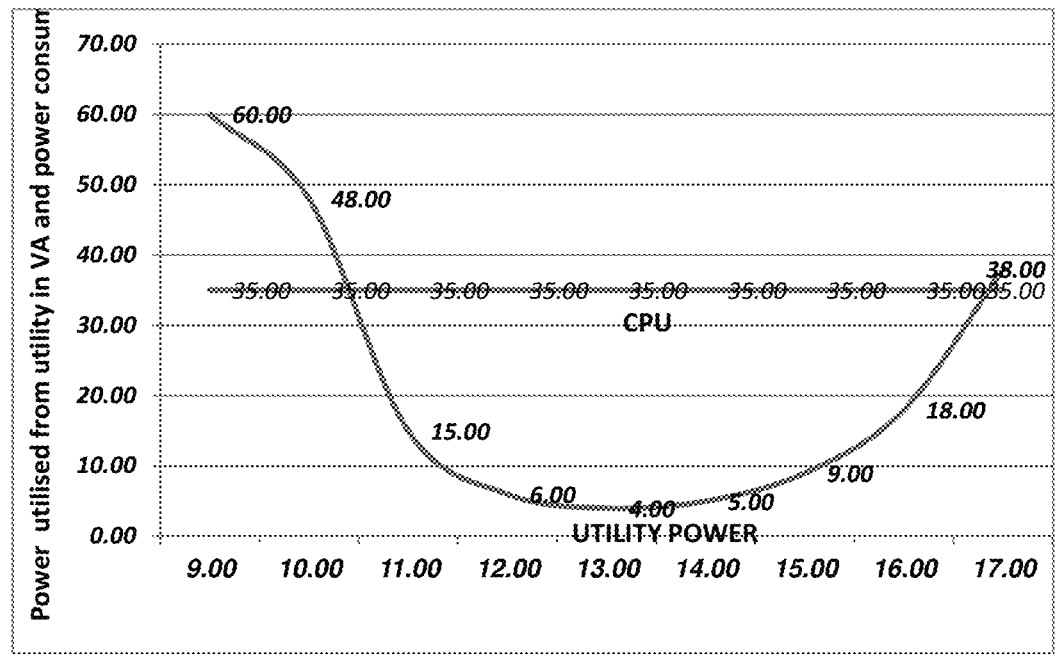
FIG. 3 shows the power utilized from utility in VA and power consumed by CPU in watts vs time with SPV panel connected.
Figure 4:
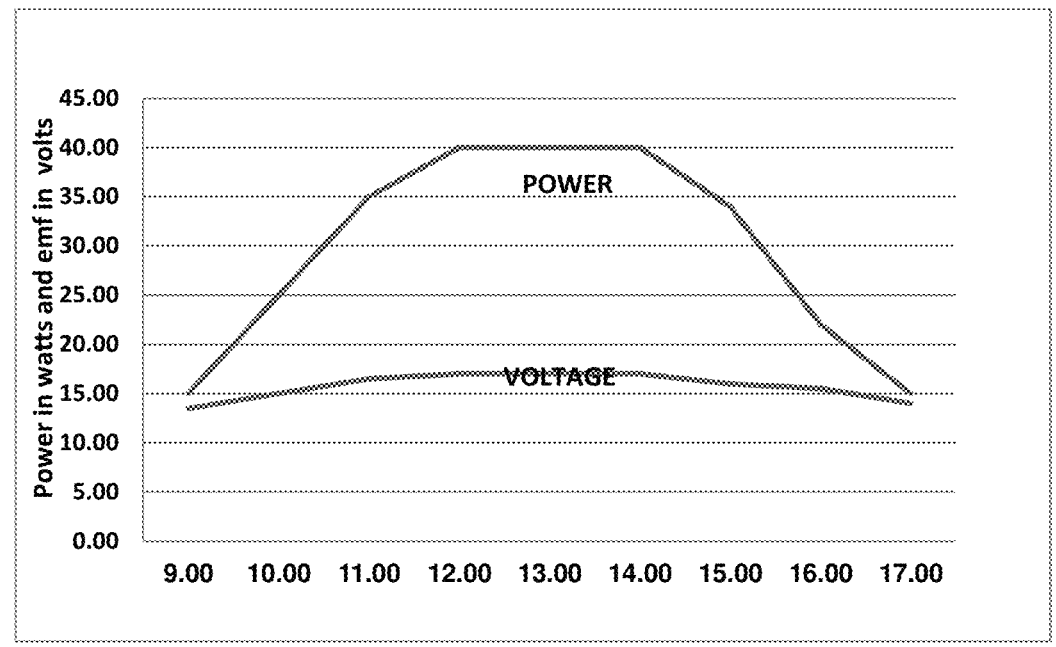
FIG. 4 shows the "Microsen" make 50 Wp solar panel performance when connected to PC.
Figure 5:
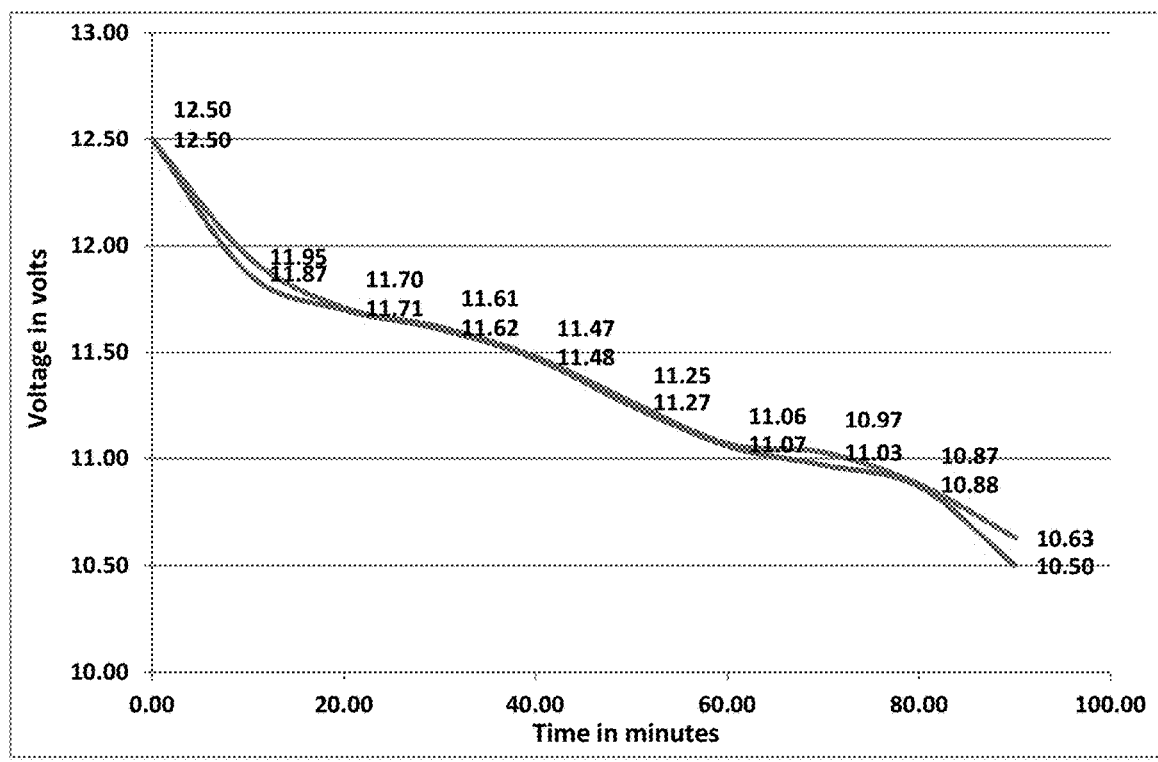
FIG. 5 shows the battery discharge characteristics—voltage vs time, for trial 1 & trial 2 conducted.
Figure 6:
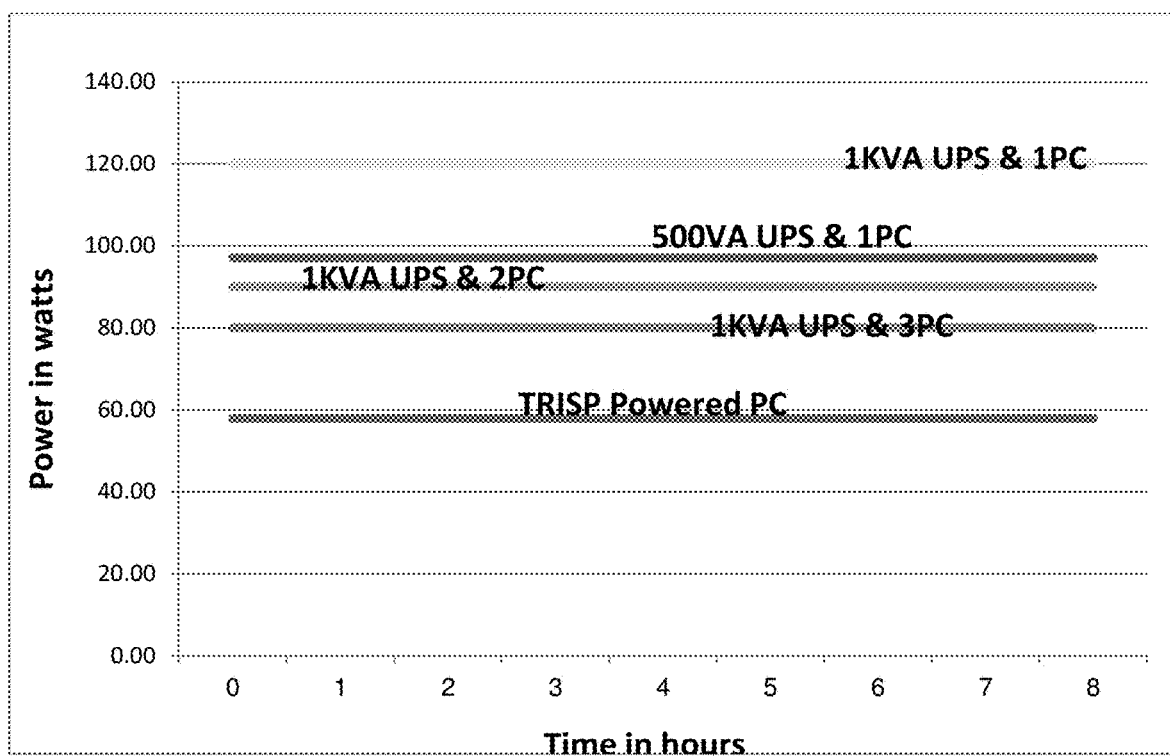
FIG. 6 shows the power consumption comparison between TRISP Powered PC and Conventional PC.

TRISP system used for desktop PC application comprises of the following components [Refer FIG. 1]:

1. 10-16V DC-DC ATX (102) PC power supplies with efficiency greater than 90% can be designed using solid state switching technology. 3.3V, 5V, 12V, -12V, 5V SB and POWER GOOD are the voltage levels required by the motherboard and related sub-systems. These voltages can be derived with very low heat loss by suitable DC-DC conversion techniques. When the power is from DC, power factor will not get affected.

2. 15V DC power supply (104) from 230V AC using PFC techniques and replacing diode rectifier by switching rectifier circuits will increase the efficiency to more than 90%.

3. A solar panel (106) of appropriate rating, depending on the type of PC or any TRISP friendly load, will power the system directly. The laboratory tests used 50 Wp solar panel to power the PC.

4. 12V SMF battery (108) (e.g. 12V/7 AH), and a current limited charger circuit.

5. LCD/LED Monitor (110) working on 12V DC (In 230V operated monitors, internal circuits are working on 12V DC or 12V and 5V DC. It is easy to convert a monitor to work on 12 VDC input).

6. A micro controller circuit (112) to monitor TRISP PC power and gives status indication of power source used. It indicates whether solar power, utility power, or backup battery is in use. The circuit also provides information on remaining backup time, and forces PC to shut down when battery is nearing exhaustion.

It is to be understood by a person of ordinary skill in the art that various modifications and variations may be made without departing from the scope and spirit of the present invention. Therefore, it is intended that the present invention covers such modifications and variations provided they come within the ambit of the appended claims and their equivalents.

EXPERIMENTAL VALIDATION

| | POWER CONSUMPTION OF TRISP (UTILITY POWER, SOLAR AND BATTERY) | | | | | | | |
|---|---|---|---|---|---|---|---|---|
| TIME (hrs) | AC (Volts) AC Voltage Input | AC (MA) AC Current Input | DC (Volt) Power supply Voltage | DC Voltage (Volts) SPV output voltage | DC Voltage (Volts) At PC power supply input | DC current (Amps) Load current (for CPU and Monitor) | DC Voltage (Volts) Charging voltage 13.8 V max | Ib (Amps) Charging current 0.7 Amp max |
| 9.15 | 230 | 261 | 14 | 14.50 | 14.06 | 2.60 | 12.3 | 0.05 |
| 9.30 | 230 | 217 | 14 | 14.67 | 14.19 | 2.60 | 12.7 | 0.08 |
| 10.00 | 230 | 191 | 14 | 14.77 | 14.35 | 2.60 | 13.1 | 0.10 |
| 10.30 | 230 | 52 | 14 | 15.50 | 15.12 | 2.50 | 13.1 | 0.11 |
| 11.00 | 230 | 35 | 14 | 16.23 | 15.7 | 2.23 | 13.4 | 0.11 |
| 11.30 | 230 | 22 | 14 | 16.52 | 16.2 | 2.22 | 13.5 | 0.12 |
| 12.00 | 230 | 17 | 14 | 16.50 | 16 | 2.15 | 13.8 | 0.15 |
| 12.30 | 230 | 17 | 14 | 16.53 | 16.2 | 2.13 | 13.8 | 0.16 |
| 13.00 | 230 | 17 | 14 | 16.40 | 15.9 | 2.16 | 13.8 | 0.17 |
| 13.30 | 230 | 17 | 14 | 16.33 | 15.8 | 2.28 | 13.8 | 0.16 |
| 14.00 | 230 | 22 | 14 | 16.20 | 15.7 | 2.17 | 13.8 | 0.15 |
| 14.30 | 230 | 30 | 14 | 16.30 | 15.8 | 2.25 | 13.6 | 0.15 |
| 15.00 | 230 | 31 | 14 | 16.10 | 15.6 | 2.17 | 13.3 | 0.14 |
| 15.30 | 230 | 35 | 14 | 15.90 | 15.4 | 2.25 | 13.3 | 0.11 |
| 16.00 | 230 | 83 | 14 | 15.60 | 15.1 | 2.25 | 13.2 | 0.09 |
| 16.30 | 230 | 133 | 14 | 15.50 | 14.9 | 2.43 | 13.2 | 0.06 |
| 17.00 | 230 | 165 | 14 | 15.16 | 14.7 | 2.40 | 13.2 | 0.06 |

We claim:

1. A triple input smart power supply for one or more electronic loads using DC as final power source functional from a predefined voltage range input with SPV (Solar Photo Voltaic) power provision and an automatic logic to prioritize solar, utility, and a battery in the preferred order, comprising:

a DC-to-DC ATX power supply for providing the predefined voltage range;

an AC-to-DC converter to generate 15V DC power supply from 230V AC using PFC techniques;

a switching logic circuit for automatically prioritize solar, utility, and a battery in a preferred order;

a solar panel of adequate capacity to supply power to the one or more electronic loads;

a battery for providing power back-up to the one or more electronic loads;

a voltage regulator and a current limited charger circuit for providing charging current to the battery; and a display unit capable of working on the predefined voltage range, wherein the switching logic circuit intelligently prioritize solar, utility, and the battery ensuring seamless change-over between the triple input sources to provide an uninterrupted power supply to the one or more electronic loads, and wherein the one or more electronic loads comprises desktop Personal Computers (PCs), the predefined voltage range comprises 10 V to 16 V DC, the DC-to-DC ATX power supply comprises a 10-16V DC-DC ATX PC power supply, the solar panel comprises a range of 50-80 Wp for Standard Desktop PC, the battery comprises a 12V, 7 AH SMF battery, and the display unit comprises a LED/LCD PC monitor, and wherein the triple input smart power supply produces a power saving of 1747200 units and thereby a cost saving of rupees 14.2 million for 10000 desktop PCs working for 8 hours per day for 312 days excluding the benefit from usage of solar energy, and savings of 24,96,000 units of energy and 20.47 million of rupees per annum if connected to the solar panel.

2. The triple input smart power supply as claimed in claim 1, wherein the DC-to-DC ATX power supply comprises solid state switching technology to provide efficiency greater than 90%.

3. The triple input smart power supply as claimed in claim 1, wherein the solar panel is capable of directly powering the one or more electronic loads.

4. The triple input smart power supply as claimed in claim 1, wherein the battery is charged from solar power or utility power or both based on the availability.

5. The triple input smart power supply as claimed in claim 1, further comprising a micro controller circuit for monitoring load power and providing status indication of the selected power source used and a remaining backup time.

6. The triple input smart power supply as claimed in claim 5, wherein the micro controller circuit provides information on the remaining backup time, and forces the one or more electronic loads to shut down when the battery is nearing exhaustion.

7. The triple input smart power supply as claimed in claim 1, wherein the triple input smart power supply saves 58% to 65% of power without the solar panel.

8. The triple input smart power supply as claimed in claim 1, wherein the desktop PC directly works on solar power and keeps the battery charged when operated between 10 am and 4 pm, thereby saving utility power during normal working hours, on reasonably sunny days.

9. The triple input smart power supply as claimed in claim 1, wherein the switching logic circuit enables to utilize even a smaller quantity of power developed in solar panel whereas balance power requirement is met from utility power source.

10. The triple input smart power supply as claimed in claim 1, wherein the charging current provided by the current limited charging circuit is determined based on an AH rating of the battery.

11. The triple input smart power supply as claimed in claim 1, wherein a back-up time of the desktop PC is increased to 80 to 110 minutes for standard desktop PC and a 12V 7 AH SMF battery.

12. The triple input smart power supply as claimed in claim 1, wherein the triple input smart power supply provides an efficiency of 90% which is incomparable with that of a normal SMPS whose efficiency is only 35%, when used along with an online UPS system.

13. The triple input smart power supply as claimed in claim 1, wherein the triple input smart power supply reduces harmonics injected to power line from UPS.

14. The triple input smart power supply as claimed in claim 1, wherein the triple input smart power supply provides an improved power factor.

15. The triple input smart power supply as claimed in claim 1, wherein the triple input smart power supply is capable of using a battery with different capacity and/or technology resulting in different backup times.

16. The triple input smart power supply as claimed in claim 1, wherein the solar panel comprises a high power solar panel array when a large number of desktop PCs and electronic loads need to work under one roof from a common low voltage DC (<21V) power bus.

* * * * *